United States Patent
Morgan et al.

(10) Patent No.: US 7,415,655 B2
(45) Date of Patent: Aug. 19, 2008

(54) METHOD AND APPARATUS FOR FULL RATE ERASURE HANDLING IN CDMA

(75) Inventors: William K. Morgan, Marengo, IL (US); Donald P. Cordell, Woodstock, IL (US); Erik C. Smith, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 18 days.

(21) Appl. No.: 11/563,444

(22) Filed: Nov. 27, 2006

(65) Prior Publication Data
US 2007/0097925 A1 May 3, 2007

Related U.S. Application Data

(62) Division of application No. 11/026,574, filed on Dec. 30, 2004, now Pat. No. 7,168,023.

(51) Int. Cl.
*H03M 13/00* (2006.01)
(52) U.S. Cl. .................. 714/774; 370/328; 370/335; 455/452.2; 455/522
(58) Field of Classification Search .............. 714/774; 370/328, 335; 455/452.2, 522; 375/219
See application file for complete search history.

(56) References Cited

U.S. PATENT DOCUMENTS

| | | | | |
|---|---|---|---|---|
| 5,946,346 | A | * | 8/1999 | Ahmed et al. ............... 375/219 |
| 6,084,904 | A | | 7/2000 | Wang et al. |
| 6,748,232 | B1 | | 6/2004 | Anderson et al. |
| 2002/0151290 | A1 | * | 10/2002 | Chen ......................... 455/266 |
| 2002/0167907 | A1 | * | 11/2002 | Sarkar et al. ................ 370/252 |
| 2003/0189911 | A1 | * | 10/2003 | Saifuddin et al. ........... 370/335 |

* cited by examiner

*Primary Examiner*—Guy J Lamarre (57) ABSTRACT

A method of processing signals received from an electronic device (106, 202) in a cellular network (100, 200) that utilizes variable rate vocoding comprising receiving a first series of low rate frames (318) at the cellular network; receiving a high rate frame (320) that has at least one bit error at the cellular network after receiving the first series of low rate frames, wherein the rate of the high rate frame can be determined; and sending a request (310) to the electronic device to retransmit the high rate frame.

4 Claims, 7 Drawing Sheets

METHOD AND APPARATUS FOR FULL RATE ERASURE HANDLING IN CDMA

RELATED APPLICATIONS

This is a divisional application of application Ser. No. 11/026,574 filed Dec. 30, 2004, now U.S. Pat. No. 7,168,023.

FIELD OF THE INVENTION

The present invention relates generally to communication systems. More specifically, the present invention relates to full rate erasure handling in a communication system.

BACKGROUND

Wireless communication systems are widely used for many different purposes. More and more people every day purchase cellular telephones or other wireless communication devices, including but not limited to pagers, computers, and Personal Digital Assistants (PDA's). These electronic devices and others are capable of receiving and transmitting information using a communication system such as a cellular network.

Code Division Multiple Access (CDMA) communication systems, such as, CDMA IS95, CDMA2000 and WCDMA, have different transmission rates on the reverse link (i.e., from a mobile station to a Base Station Transceiver (BTS)). For example, there are full rate frames, half rate frames, quarter rate frames and eighth rate frames. The different rates are used depending upon the data being transmitted by a mobile station. During a series of eighth rate frames, the reverse power control in the cellular network will step down the power transmission Outer Loop Threshold (OLT) causing the transmission power of the mobile station to reduce to the minimal energy required to meet a desired frame error rate (FER) target.

When the transmission power is very low there are times when the mobile station will transmit a full rate frame (for example, when sending a Pilot Strength Measurement Message (PSMM)). Because the transmission power of the mobile station has been stepped down, it is very likely that the BTS will not be able to properly decode the full rate frame. When the full rate frame is a PSMM this can lead to a call being dropped. If the full rate frame is voice data, there will be poor voice quality. One current solution to this problem, that is not very effective, is to arbitrarily increase the OLT after a certain number of consecutive eighth rate frames (for example, after 50 eighth rate frames).

BRIEF DESCRIPTION OF THE DRAWINGS

The features and advantages of the present invention will be apparent from the following description, presented in conjunction with the following drawings wherein.

Corresponding reference characters indicate corresponding components throughout the several views of the drawings. Skilled artisans will appreciate that elements in the figures are illustrated for simplicity and clarity and have not necessarily been drawn to scale. For example, the dimensions, sizing, and/or relative placement of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is usually accorded to such terms and expressions by those skilled in the corresponding respective areas of inquiry and study except where other specific meanings have otherwise been set forth herein.

DETAILED DESCRIPTION

The following description is not to be taken in a limiting sense, but is made merely for the purpose of describing the general principles of the invention. The scope of the invention should be determined with reference to the claims. The present embodiments address the problems described in the background while also addressing other additional problems as will be seen from the following detailed description.

One embodiment can be characterized as a method of processing signals received from an electronic device in a cellular network that utilizes variable rate vocoding comprising receiving a first series of low rate frames at the cellular network; receiving a high rate frame that has at least one bit error at the cellular network after receiving the first series of low rate frames, wherein the rate of the high rate frame can be determined; and sending a request to the electronic device to retransmit the high rate frame.

Another embodiment provides a method of transmitting data between an electronic device and cellular network that utilizes variable rate vocoding comprising receiving a series of low rate frames at the cellular network; receiving a high rate frame that has at least one bit error at the cellular network after receiving the series of low rate frames, wherein the rate of the high rate frame can be determined; and making a full rate step up in an outer loop threshold in response to receiving the high rate frame.

Yet another embodiment includes a method of sending signals from an electronic device to a cellular network that utilizes variable rate vocoding comprising sending a first series of low rate frames to the cellular network; sending a first high rate frame to the cellular network after sending the first series of low rate frames, wherein the rate of the first high rate frame can be determined by the cellular network and wherein the first high rate frame can not be decoded by the cellular network; and receiving a request from the cellular network to transmit a second high rate frame, wherein the second high rate frame is a control frame and wherein the request from the cellular network is in response to the first high rate frame not being able to be decoded by the cellular network.

These various embodiments tend to allow for a reduction in dropped calls as compared to prior systems. Various embodiments also provide an increase in voice quality as compared to prior systems. The embodiments described herein can be implemented on, for example, a third generation (3G) cellular system, such as, CDMA2000, WCDMA, or other CDMA systems. Additionally, any cellular system that utilizes a variable rate vocoder can implement the different embodiments described herein.

Figure 1:
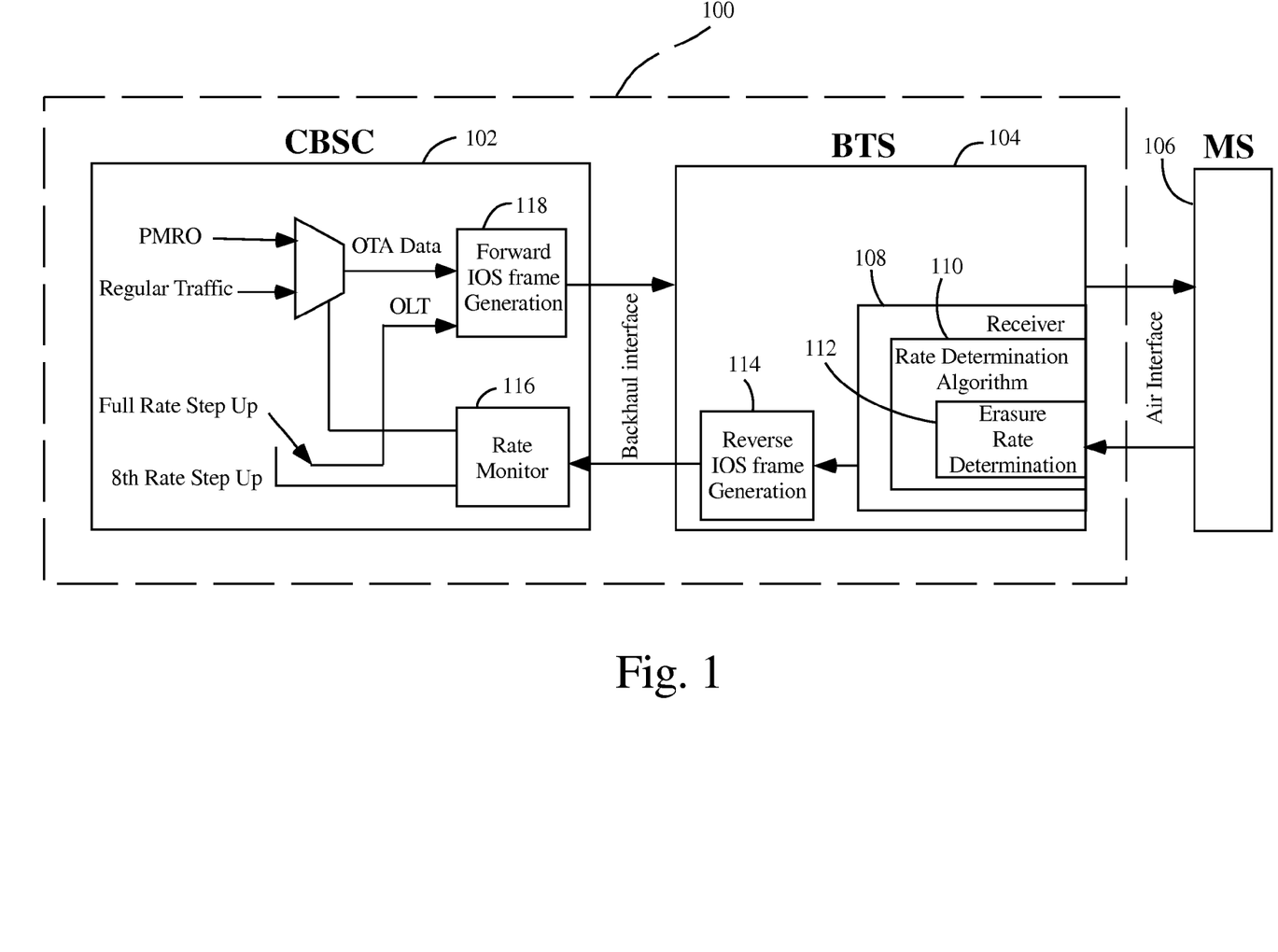
FIG. 1 is a block diagram illustrating communication between a RAN (Radio Access Network) and an electronic device in accordance with one embodiment of the present invention.

Referring to FIG. 1 a block diagram is shown illustrating a wireless communication system comprising a Radio Access Network (RAN) 100 in wireless communication with an electronic device 106 in accordance with one embodiment of the present invention. The Radio Access Network (RAN) 100 includes a Central Base Station Controller (CBSC) 102 coupled to a Base Transceiver Station (BTS) 104. The BTS 104 includes a receiver 108 having a rate determination algorithm module 110 and an erasure rate determination module 112 and further includes a reverse Interoperability Specification (IOS) frame generation module 114 that is coupled to the receiver. The CBSC 102 includes a rate monitor module 116 and a forward IOS frame generator 118. The electronic device 106 is a portable wireless communication device that is capable of communicating with the RAN 100, such as is known in the art. Preferably, the electronic device 106 comprises a mobile station. and may be any of, but not limited to, a cellular telephone, a personal computer, a notebook computer, or a PDA.

In operation, the mobile station 106 sends frames of data at variable rates to the BTS 104. For each received frame of data, the rate determination algorithm module 110 determines the rate of the frame (for example, full rate, half rate, quarter rate, and eighth rate). Additionally, the erasure rate determination module 112 determines the rate of each frame that includes bit errors. The reverse IOS frame generation module 114 is coupled to the receiver and generates frames to be sent to the CBSC 102. In prior systems, frames that did not include bit errors would be sent through to the CBSC 102 and any frames that contained errors (i.e., could not be properly encoded) were sent as an erasure. In accordance with the present embodiment, the reverse IOS frame generation module 114 will send a full rate erasure frame to the CBSC 102 for any frame that includes bit errors and is a full rate frame.

In one embodiment, upon receipt of the full rate erasure, the rate monitor module 116 will make a full rate step up in the Outer Loop Threshold (OLT). This causes the mobile station 106 to quickly increase transmission power. In another embodiment, the rate monitor module 116 will cause a Pilot Measurement Request Order (PMRO) to be sent to the mobile station 106. This causes the mobile station 106 to send a Pilot Strength Measurement Message (PSMM). The CBSC 102 increases the OLT and sends a PMRO in response to receiving a full rate erasure.

In one embodiment, the mobile station 106 has different frame rates for transmission of a frame of data when in a voice call. This is known as having variable rate vocoding. When the mobile station 106 is transferring voice data the mobile station 106 is generally transferring voice data at a full rate frame. When there is no voice data being transferred and there is no messaging being sent from the mobile station 106 to the BTS 104, then eighth rate frames are transmitted. During a successive period of eighth rate frames, the OLT is stepped down and the transmission power of the mobile station is also stepped down in order to meet a target frame error rate (FER). The transmission power of the mobile station 106 is stepped down until the BTS 104 can not read the frame (this is known as an erasure). After an erasure, the transmission power will be stepped back up. The amount the power is stepped up depends upon the actual frame rate (e.g., full rate, half rate, or eighth rate) of the erasure or the perceived rate of the erasure as determined by the erasure rate determination module 112.

In prior systems, a problem occurs when there is a succession of eighth rate frames and the mobile station 106 is transmitting at a low power and the mobile station sends a control message. The control message (for example a PSMM) is sent by the mobile station 106 as a full rate frame. Due to the low transmit power level, the BTS 104 may not be able to properly decode the control message. The control message is very important in order to keep a voice call from dropping because the control messages are what put the mobile station into various hand-off modes (e.g., allowing a call to be transferred to a different BTS). Therefore, if the transmission power is low because of a string of eighth rate frames the control message may be missed by the BTS 104 and the call can drop.

The rate determination module 110 in the BTS 104 determines the rate of a frame. The rate determination algorithm 110 (including the erasure rate determination module 102) determines or estimates the frame rate even if the frame can not be decoded due to the power level being low. As described above, in CDMA systems having a low transmission power level from the mobile station 106 to the BTS 104 can cause bit errors within a frame. Generally these frames are marked as an erasure and the frame is disregarded by the BTS 104. Utilizing the rate determination algorithm 110, such as is described in U.S. patent application Ser. No. 10/408,497, filed Apr. 7, 2003, entitled APPARATUS AND METHOD FOR PROCESSING A CORRUPTED FRAME, even though the frame can not be decoded, the frame rate can still be determined.

In accordance with the present embodiment, upon detection of a full rate frame after a string of eighth rate frames, and subsequently followed by more eighth rate frames, there is a very good chance that the full rate frame was a control message (for example, a PSMM). The rate monitor module 116, upon seeing this condition, will cause a request (e.g., a Pilot Measurement Request Order (PMRO)) to be sent to the mobile station 106. The request forces the mobile station to resend the control message. During the delay between the control message and the request the transmission power of the mobile station 106 is increased sufficiently such that the BTS 104 is able to decode the control message the second time it is sent by the mobile station 106. Advantageously, this keeps the call from dropping. In prior systems, the mobile station 106 will eventually resend the control message, however, this will only occur after a time out period that may be to long to keep the call from dropping. By requesting another control message, the mobile station 106 will resend the control message much faster that the prior systems.

In another embodiment, during a voice call when a user is not speaking the mobile station 106 transmits a long string of eighth rate frames. When the user begins to speak, the mobile station 106 will then send the voice data in a full rate frame. As described above, during a string of eighth rate frames the transmit power is stepped down. Thus, many times, when the first full rate frame is transmitted by the mobile station 106 the power is too low for the BTS 104 to decode the frame. In prior systems, the BTS 104 will adjust the outer loop threshold (OLT) at an eighth rate step up because the last decoded frame was an eighth rate frame. This is because prior systems disregard the frame rate of any frame that can not be properly decoded. The small adjustment (i.e., the eighth rate step up) in the OLT causes the device to power up slowly and thus additional full rate frames are sent at a low power.

In order to solve this problem, upon detection of a full rate frame that can not be decoded, instead of marking the frame as an erasure, the frame is marked as a full rate erasure. The CBSC 102 then makes a full rate step up in the OLT which causes the mobile station 106 to make a faster increase in transmission power. Therefore, subsequent full rate frames are sent at a higher power sooner than as compared to prior systems. This provides a decrease in the number of full rate frames that can not be decoded and thus an increase in voice quality.

Figure 2:
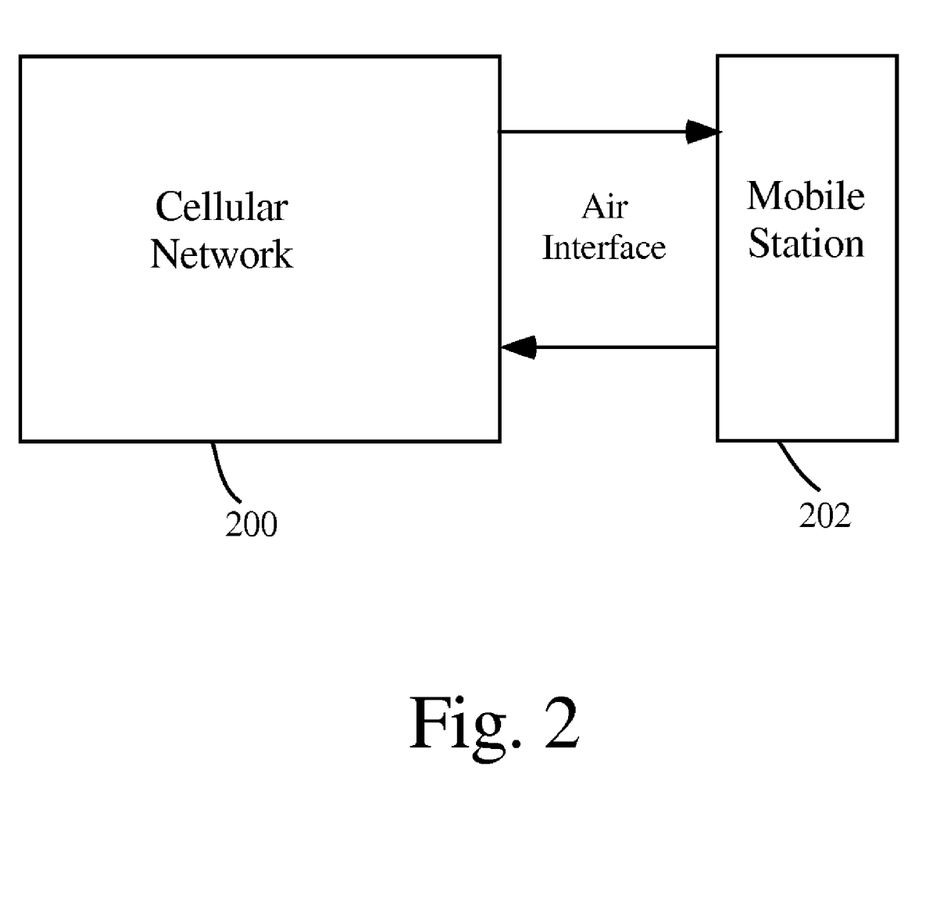
FIG. 2 is a block diagram illustrating communication between a cellular network and an electronic device in accordance with another embodiment of the present invention.

Referring to FIG. 2 a block diagram is shown illustrating communication between a cellular network and an electronic device in accordance with another embodiment of the present invention. Shown is a cellular network 200 and an electronic device 202.

In one embodiment of the present invention, the cellular network 200 is any cellular network that uses a variable rate vocoder. When the cellular network 200 receives a string of low rate frames (for example, an eighth rate frame), followed by a high rate frame that can not be decoded (for example, a full rate frame) followed by more low rate frames, the cellular network 200 will send out a request for retransmission of the full rate frame. This is because the cellular network 200 will assume that the full rate frame was a control message and not a voice frame and thus, the cellular network will request that the control message be resent. In one embodiment, the control message is a PSMM and the request for retransmission is a PMRO. The PSMM that is resent can include the same data as the previous PSMM or can include updated data.

In another embodiment of the present invention, during a voice call there can be times when the electronic device 202 is transmitting a long string of eighth rate frames (for example, when a user is not talking). Once the user begins to talk again, the electronic device 202 begins transmitting full rate frames. Because the power was stepped down during the transmission of the eighth rate frames, the full rate frames may not be able to be decoded by the cellular network 200. However, the cellular network 200 may be able to determine the rate of the frame event though it can not be decoded. When the cellular network 200 detects the full rate frame, instead of making a small step up on the OLT, such as an eighth rate step up when the preceding frames are eighth rate frames, the cellular network 200 will make a full rate step up in the OLT, thus causing the power transmission of the electronic device to increase rapidly. This reduces the number of full rate frames that are sent at a power level that is to low for the cellular network 200 to decode.

Figure 3:
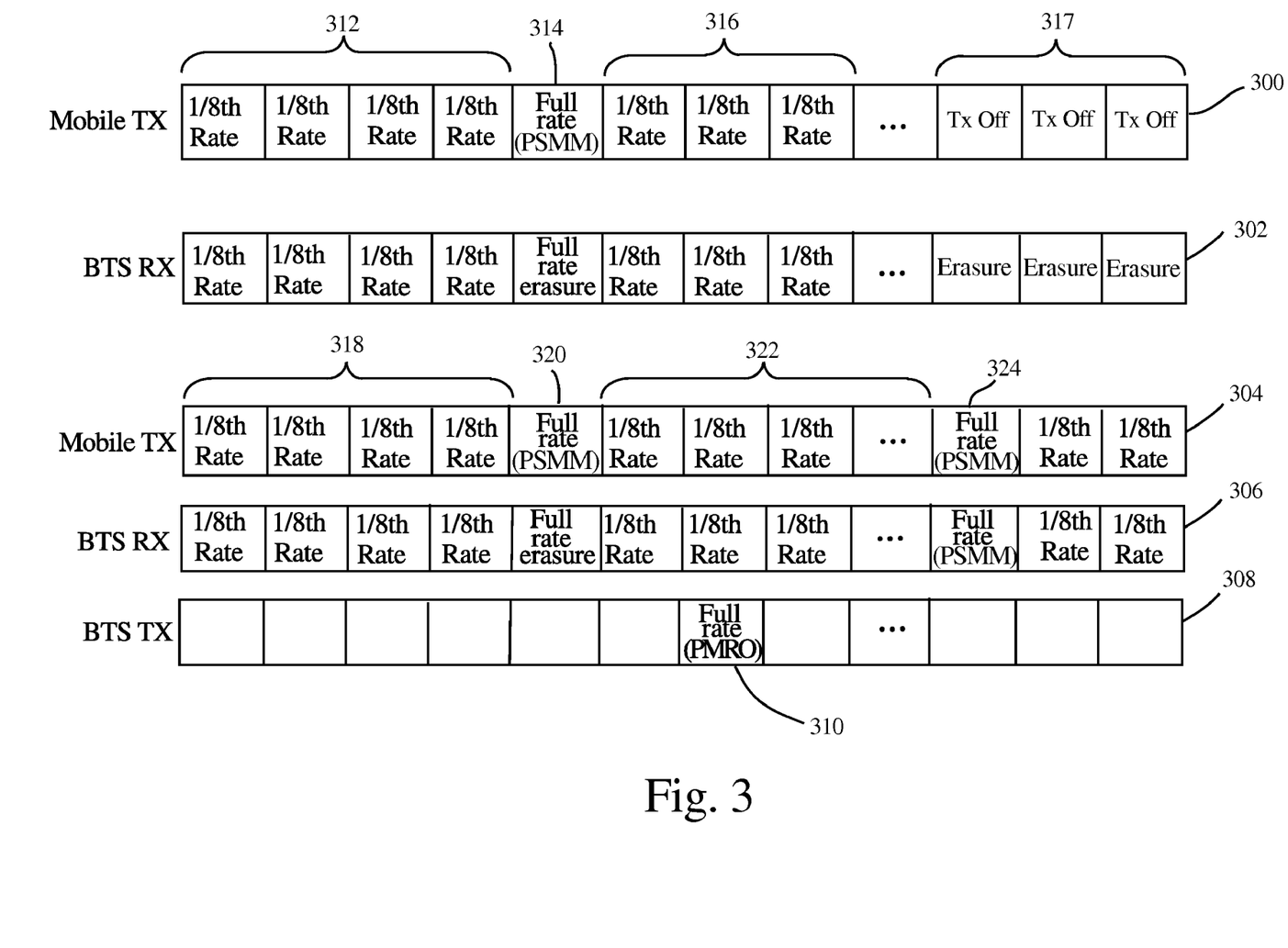
FIG. 3 is a diagram illustrating signaling between an electronic device and RAN both without utilization of a full rate erasure and with utilization of a full rate erasure in accordance with an embodiment of the present invention.

Referring to FIG. 3 a diagram is shown illustrating signaling between an electronic device and RAN both without and with utilization of a full rate erasure for the purpose of illustrating the principles of the invention. Frame streams 300 and 302 depict a transmission of frames from a mobile station (frame stream 300) and receipt of the frames at a RAN (frame stream 302) without utilization of a full rate erasure, which may eventually lead to a lost call. Frame streams 304, 306, and 308 depict a transmission of frames from a mobile station (frame stream 304, receipt of the frames at a RAN (frame stream 306), and transmission from the RAN to the mobile station (frame stream 308) utilizing a full rate erasure in accordance with an embodiment of the present invention.

With respect to frame streams 300 and 302, a mobile station transmits a series of eighth rate frames 312 followed by a full rate frame 314. The full rate frame 314 is followed by a second series of eighth rate frames 316. In prior systems, when a RAN received the full rate frame (for example, a PSMM) that was not able to be read or that contained bit errors, a BTS associated with the RAN would treat the full rate frame as a normal erasure and disregard the frame. Additionally, the OLT is adjusted upward by the RAN at an eighth rate step up. The RAN makes an eighth rate step up because the last frame the RAN was able to decode was an eighth rate frame.

By contrast, with respect to frame streams 304, 306, and 308 and in accordance with an embodiment of the invention, a mobile station, such as mobile station 106, transmits a series of eighth rate frames 318 followed by a full rate frame 320. The full rate frame 320 is followed by a second series of eighth rate frames 322. When the full rate frame can not be decoded a RAN, such as RAN 104, the RAN transmits a PMRO 310 to the mobile station. Receipt of the PMRO triggers the mobile station to resend a full rate frame 324 (for example, a PSMM). Sending the full rate frame 324 keeps the call from dropping. In most instances, the full rate frame 324 is a control frame when the full rate frame has a string of eighth rate frames on either side of the full rate frame 320. This is as compared to the situation of transmitting voice frames at full rate there will generally be more than one full rate frame in succession.

Figure 4:
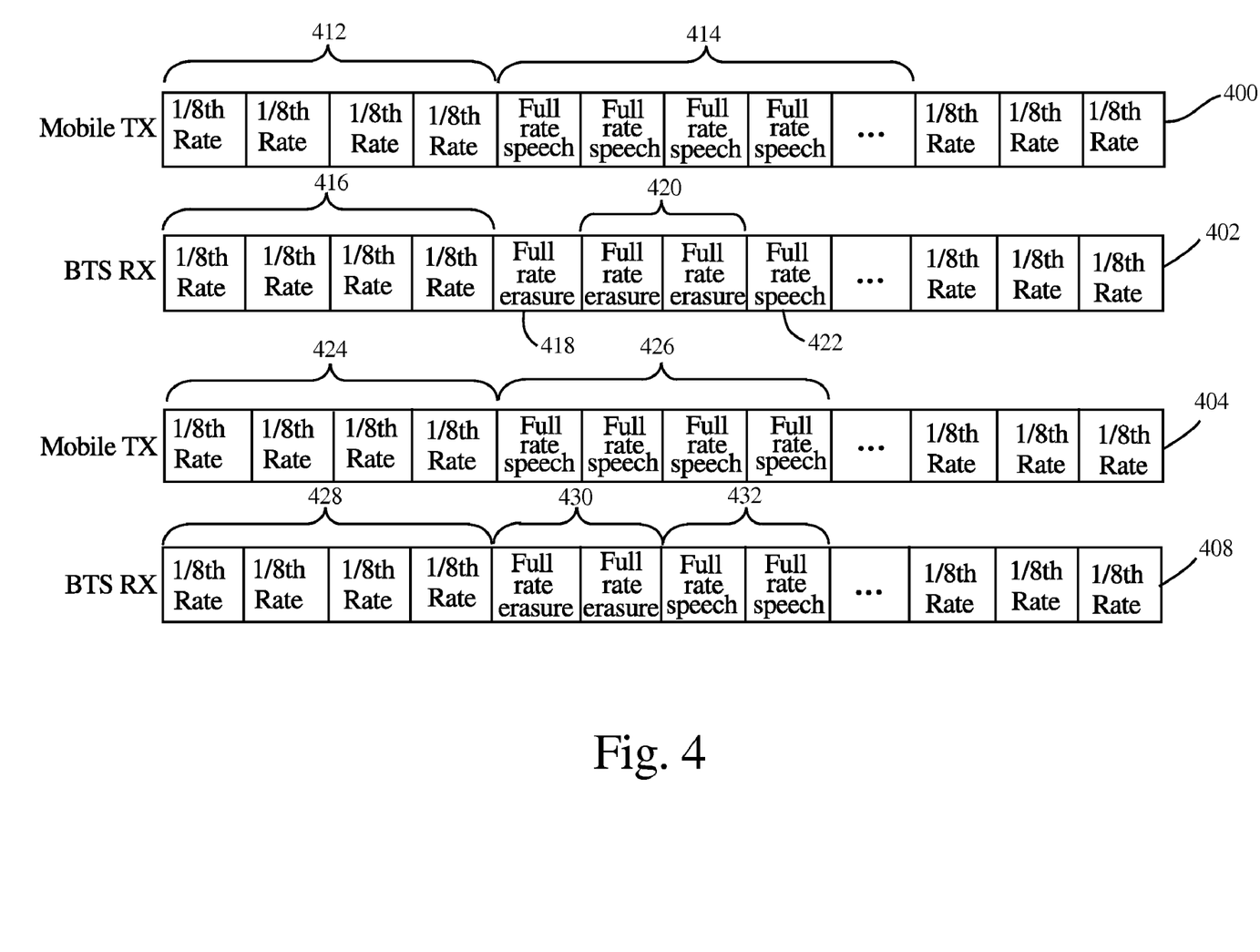
FIG. 4 is a diagram illustrating signaling between an electronic device and RAN both without utilization of a full rate erasure and with utilization of a full rate erasure in accordance with another embodiment of the present invention.

Referring to FIG. 4 a diagram is shown illustrating signaling between an electronic device and a RAN both without and with utilization of a full rate erasure for the purpose of further illustrating the principles of the present invention. Frame streams 400 and 402 depict a transmission of frames from a mobile station (frame stream 400) and a receipt of the frames at a BTS (frame stream 402) without utilization of a full rate erasure in accordance with the prior art. Frame streams 404 and 406 depict a transmission of frames from a mobile station (frame stream 404) and receipt of the frames at a BTS (frame stream 406) with utilization of a full rate erasure in accordance with another embodiment of the present invention.

With respect to frame streams 400 and 402, a mobile station transmits a series of eighth rate frames 412 (for example, during periods when a user is not talking) followed by a series of full rate frames 414 (for example, during periods when a user is talking). In prior systems, when a RAN receives the string of eighth rate frames followed by a full rate frame 418 that can not be decoded, the RAN steps the Outer Loop Threshold up at an eighth rate step up. The eighth rate step up causes the mobile station to slowly increase transmission power, thus causing additional full rate frames 420 that can not be decoded. The power will slowly increase until the full rate frames 422 can be decoded. As an illustration, the RAN receives three full rate frames that are erased before receiving a full rate frame that can be decoded.

With respect to frame streams 404 and 406, a mobile station, such as mobile station 106, transmits a series of eighth rate frames 424 (for example, during periods when a user is not talking) followed by a series of full rate frames 426 (for example, during periods when a user is talking). A RAN, such as RAN 100, upon detection of a string of eighth rate frames 428 followed by a full rate frame 430 that can not be decoded, increases the OLT by a full rate step up. The full rate step up causes a rapid increase in the transmission power from the mobile station to the RAN and leads to fewer full rate frames that can not be decoded. As an illustration the RAN receives two full rate frames that are erased before receiving a full rate frame that can be decoded. It should be understood that the number of full rate frames that are erased is illustrative only; however, fewer full rate erasures will occur in accordance with the various embodiments of the present invention.

Figure 5:
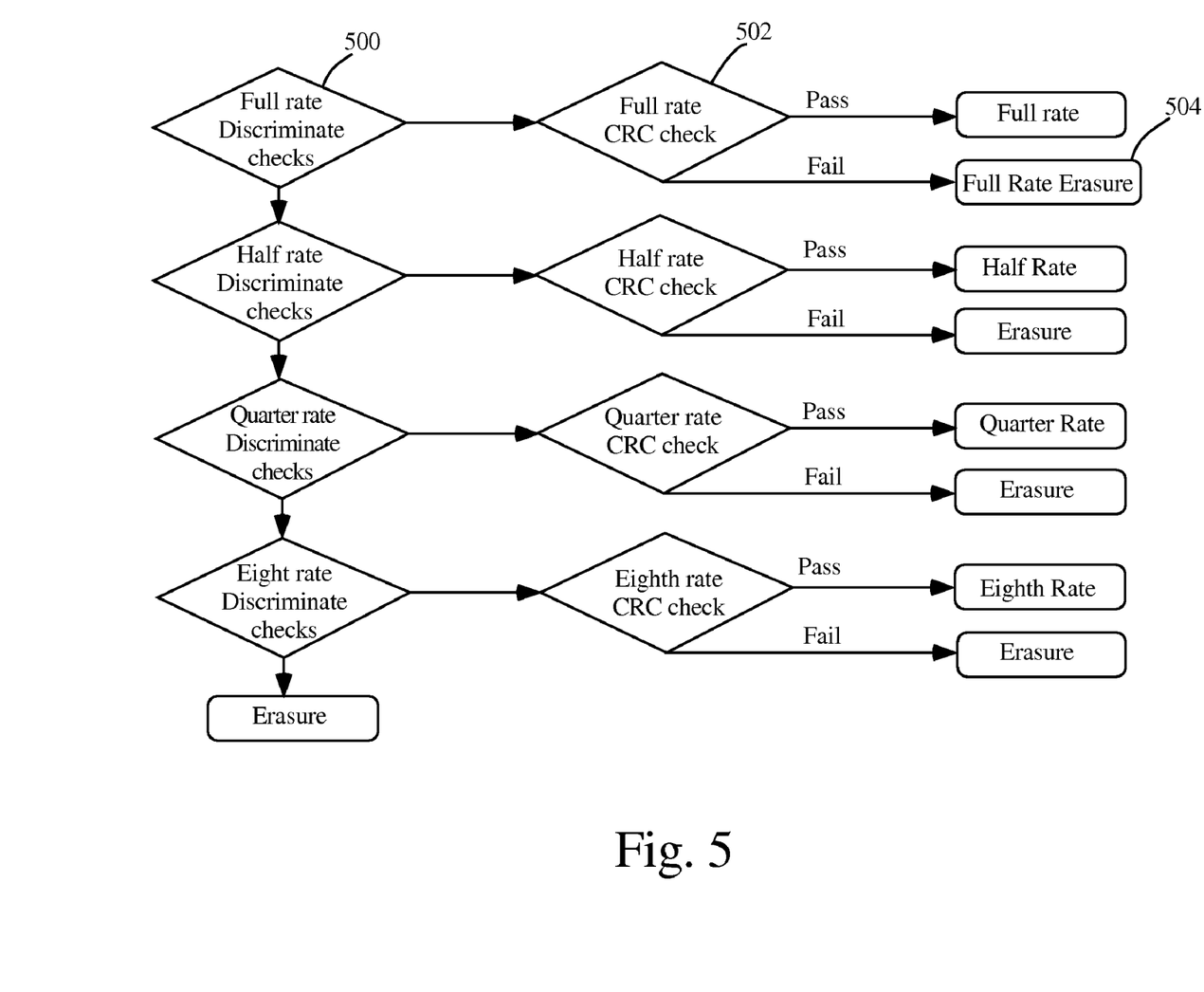
FIG. 5 is a diagram illustrating the detection of a full rate erasure in accordance with one embodiment of the present invention.

Referring to FIG. 5 a logic flow diagram is shown illustrating the detection of a full rate erasure in accordance with one embodiment of the present invention. When a full rate frame is detected 500 and does not pass a cyclic redundancy check (CRC) 502, instead of the frame being marked as an erasure (such as in prior art systems), the frame is marked as a full rate erasure 504. As described above with reference to FIGS. 2 and 3, a cellular network, such as cellular network 200 or RAN 100, either makes a full step up in the outer loop threshold or sends out a PMRO in response to a frame that is a full rate erasure 504. Alternatively, the cellular network sends out a PMRO and also makes a full rate adjustment in the OLT. The PMRO will force the mobile to send a PSMM. The full rate adjustment in the OLT causes the mobile station to rapidly increase transmission power. In prior art systems the frame would be marked only as an erasure and be essentially ignored by the cellular system.

Figure 6:
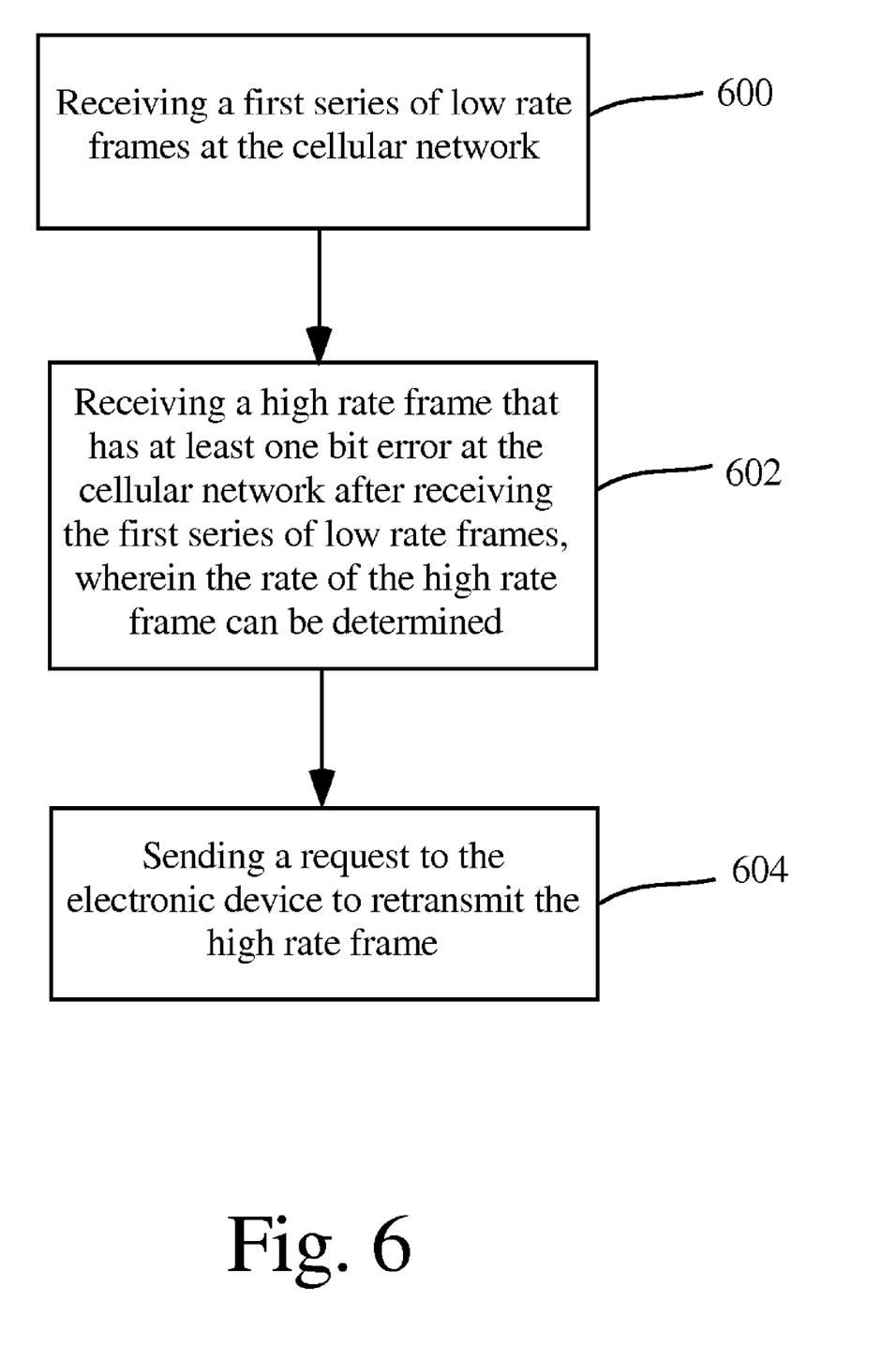
FIG. 6 is a flow diagram illustrating a method of signaling between an electronic device and a mobile station in an electronic device in accordance with one embodiment of the present invention.

Referring to FIG. 6 a logic flow diagram is shown illustrating a method of signaling between an electronic device, such as mobile station 106 or mobile station 202, and a cellular network, such as, such as cellular network 200 or RAN 100, in accordance with one embodiment of the present invention. In step 600, a first series of low rate frames are received at the cellular network. This happens, for example, during times when a user of the electronic device is not talking. Next, in step 602, a high rate frame that has at least one bit error is received at the cellular network after receiving the first series of low rate frames. The rate of the high rate frame can be determined even though the frame contains a bit error and can not be properly decoded. In step 604, following the receipt of the high rate frame, a request is sent to the electronic device to retransmit the high rate frame. Utilization of the recited method assumes in this embodiment that the high rate frame was a control frame.

Figure 7:
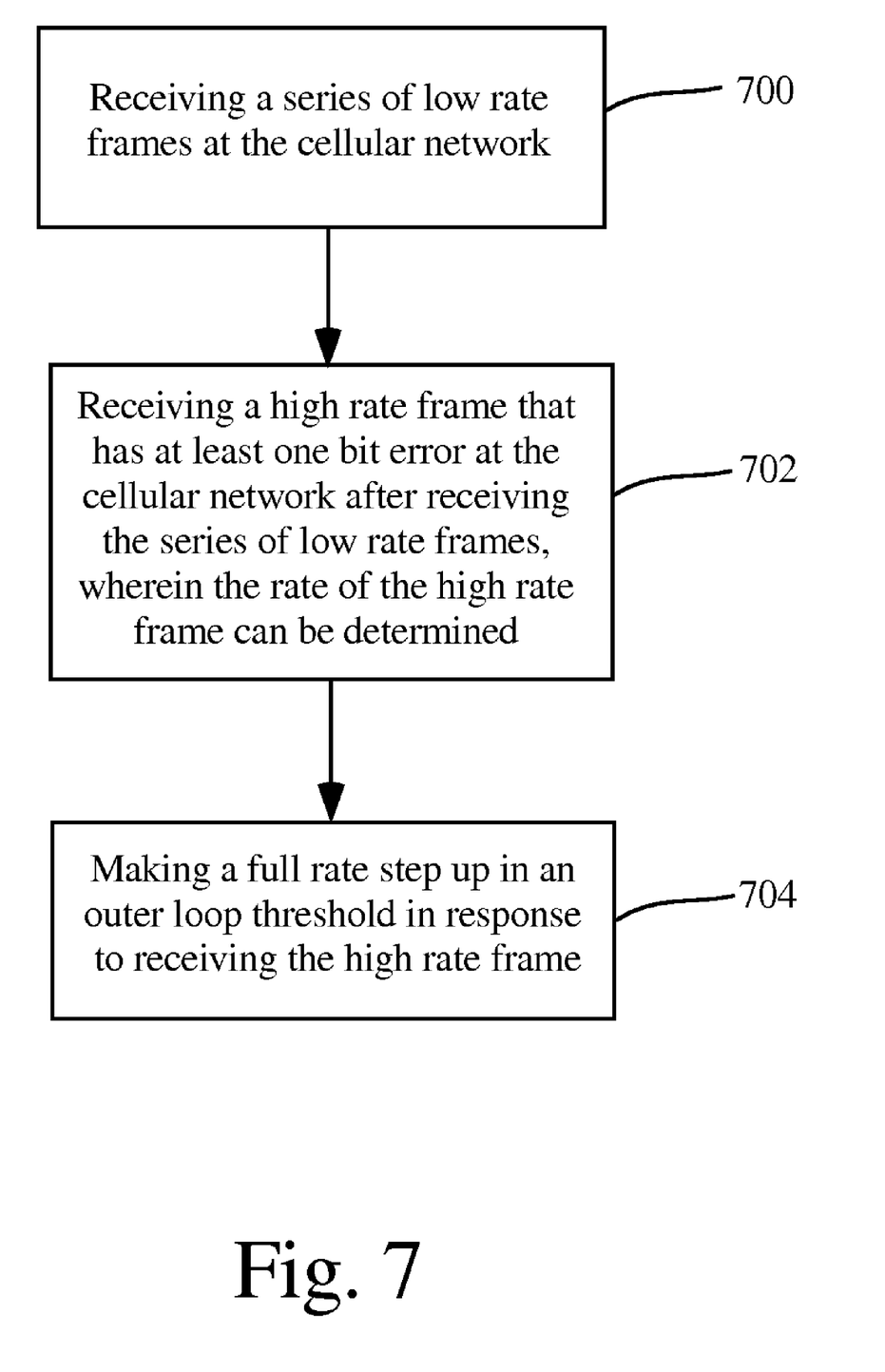
FIG. 7 is a flow diagram illustrating a method of signaling between an electronic device and a mobile station in an electronic device in accordance with another embodiment of the present invention.

Referring next to FIG. 7 a logic flow diagram is shown illustrating a method of signaling between an electronic device, such as mobile station 106 or mobile station 202, and a cellular network, such as, such as cellular network 200 or RAN 100, in accordance with another embodiment of the present invention. In step 700, a series of low rate frames are received at the cellular network. Next, in step 702, a high rate frame that has at least one bit error is received at the cellular network after receiving the series of low rate frames. The rate of the high rate frame can be determined even though the frame contains a bit error and can not be properly decoded. In step 704, following the receipt of the high rate frame, a full rate step up in an Outer Loop Threshold is made in response to receiving the high rate frame. This causes a fast increase in the transmission power of the mobile station.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

We claim:

1. A method of transmitting data between an electronic device and cellular network that utilizes variable rate vocoding comprising:
   receiving a series of low rate frames at the cellular network;
   receiving a high rate frame that has at least one bit error at the cellular network after receiving the series of low rate frames, wherein the rate of the high rate frame can be determined; and
   making a step up from the low rate frames to full rate frames in an outer loop threshold in response to receiving the high rate frame.

2. The method of claim 1 further comprising utilizing a rate determination algorithm to determine the rate of the high rate frame.

3. The method of claim 1 wherein the low rate frames are eighth rate frames.

4. The method of claim 1 further comprising sending a request to the electronic device to retransmit the high rate frame.

* * * * *